Figure 3:
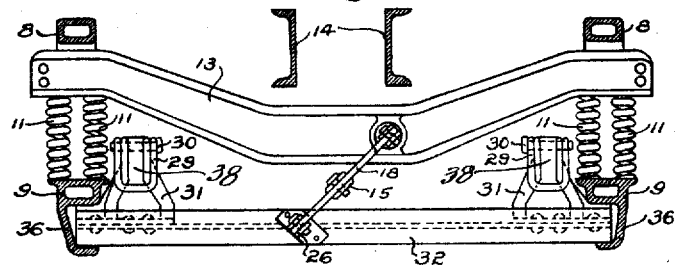

B. W. KADEL.
CAR TRUCK BRAKE.
APPLICATION FILED AUG. 21, 1916.
1,241,395.
Patented Sept. 25, 1917.
2 SHEETS—SHEET 1.
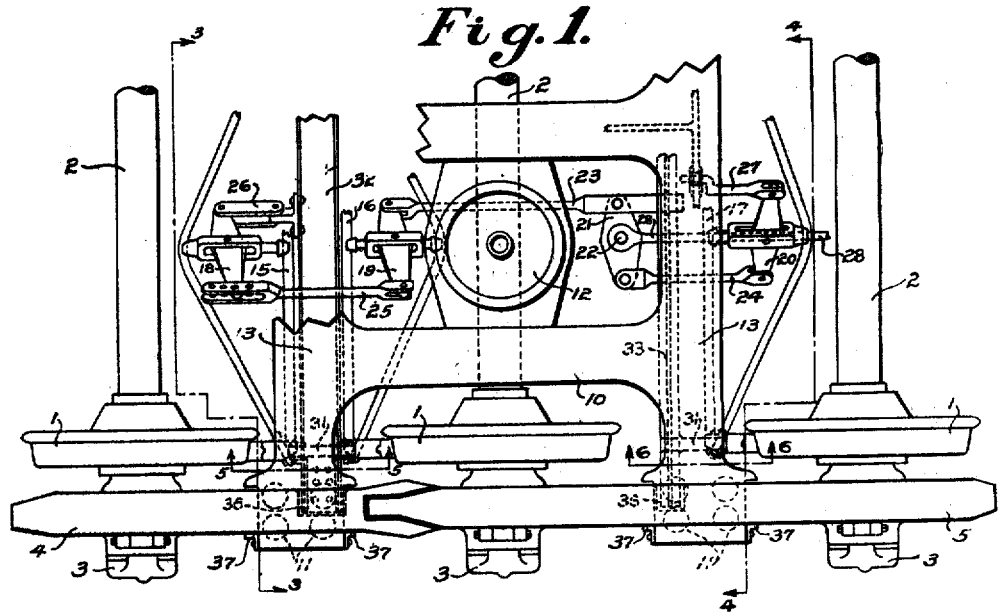
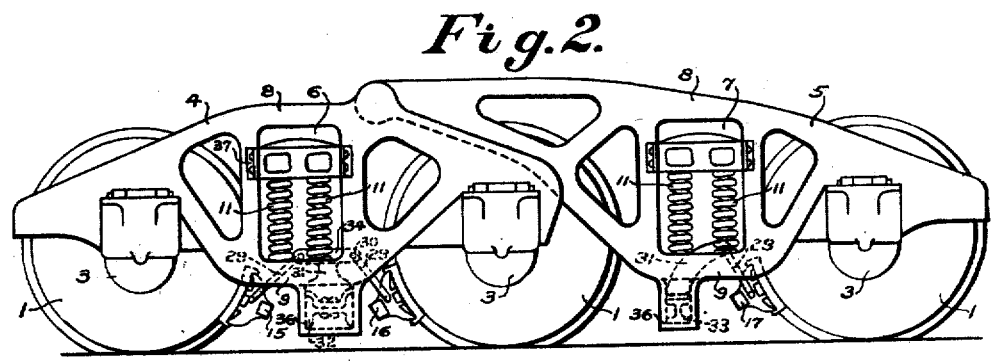
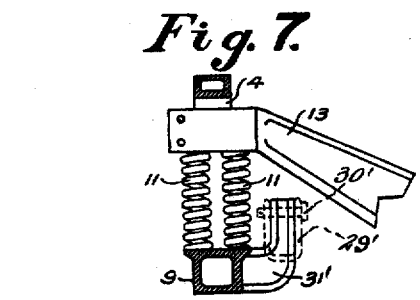
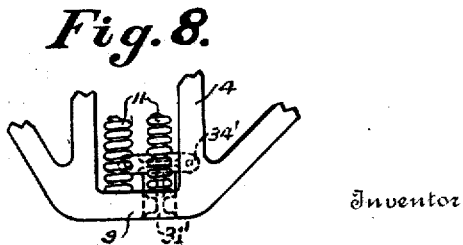
Witness
Earl N. Fisher
Inventor
Byers W. Kadel.

B. W. KADEL.
CAR TRUCK BRAKE.
APPLICATION FILED AUG. 21, 1916.

1,241,395.

Patented Sept. 25, 1917.
2 SHEETS—SHEET 2.

Witness
Earl H. Fisher

Inventor
Byers W. Kadel.

UNITED STATES PATENT OFFICE.

BYERS W. KADEL, OF ROANOKE COUNTY, VIRGINIA.

CAR-TRUCK BRAKE.

1,241,395. Specification of Letters Patent. Patented Sept. 25, 1917.

Continuation in part of application Serial No. 99,994, filed May 26, 1916. This application filed August 21, 1916. Serial No. 116,044.

*To all whom it may concern:*

Be it known that I, BYERS W. KADEL, a citizen of the United States, residing in the county of Roanoke and State of Virginia, have invented certain new and useful Improvements in Car-Truck Brakes, of which the following is a specification.

This invention relates to car truck brakes and is a continuation in part of my previous application for U. S. Letters Patent on car trucks, Serial No. 99994, filed May 26, 1916, the same having been allowed under date of July 14, 1916. Among the objects of the present invention is to provide an improved arrangement of brake levers. Another object is to provide improved means for supporting and guiding the brake parts. Incidental objects will appear as the description is set forth. With such objects in view the invention lies in the formation of parts and in their combination and arrangement, all as shown in the preferred embodiment depicted in the drawings and as described herein and finally pointed out in the claims.

Figure 4:
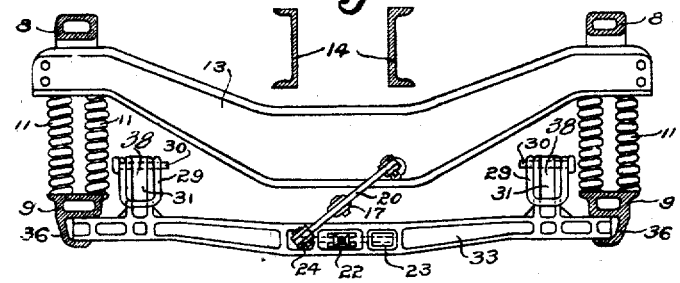
Figure 5:
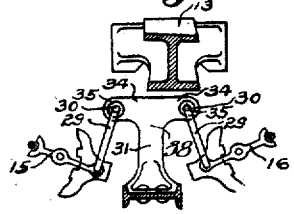
Figure 6:
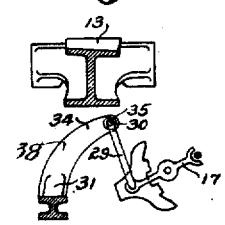

In the drawings, Figure 1 is a broken plan view of a car truck having the features of my invention applied thereto and Fig. 2 is a side elevational view of the same. Fig. 3 is a transverse vertical section taken approximately on the line 3—3 of Fig. 1 and showing also the draft sills of the car body. Fig. 4 is a similar view taken approximately on the line 4—4 of Fig. 1 and also showing the draft sills. Figs. 5 and 6 are detached vertical sectional views taken approximately on the lines 5—5 and 6—6 of Fig. 1 respectively. Fig. 7 is a partial transverse vertical section corresponding in part with Fig. 3 and showing a modified form of the brake hanger bracket construction. Fig. 8 is a partial side elevational view showing the form of bracket disclosed in Fig. 7.

In these drawings there is depicted a truck having wheels 1, axles 2 and oil boxes 3. Side frames 4 and 5 of the customary type, with window openings 6 and 7 and upper and lower arch members 8 and 9 are provided along each side of the truck, the same being supported upon the oil boxes 3. A bolster 10 has arms extending through these window openings and is carried on the bottom arch member 9, the springs 11 being interposed therebetween. The load of the car is received on a center plate 12 on the bolster and the bolster is provided with transverse members 13 which are dropped down at their centers to pass under the car body draft sills 14, the ends of these cross bolsters being somewhat higher than their central portions to provide space for the truck brake hanger brackets.

For braking the truck there are provided three brake beams 15, 16 and 17, each with the customary brake heads and shoes for contact with the wheels. There is provided a lever for each beam, these being designated 18, 19 and 20 respectively and to then their respective beams are pivoted between the extremities of the levers. There is then provided an equalizing lever 21, the same having a pivot point 22 between its extremities. A lever-actuating member 23 extends from one extremity of the lever 21 to the one extremity of the lever 19 and a second lever-actuating member 24 extending between the other extremity of the lever 21 and one extremity of the lever 20. A third lever-actuating member 25 extends from the other extremity of the lever 19 to the one extremity of the lever 18, the other extremities of the levers 18 and 20 being provided with pivot points. As is usual in such brake lever systems, the brake levers may be actuated from any of the fixed pivot points, the others being fulcrumed, and in the embodiment shown in the drawings the pivot extremities of the levers 18 and 20 are provided with fulcrums 26 and 27 respectively, the lever-actuating member 28 being connected to the pivot point 22 of the lever 21. Thus a pull on the rod 28 will actuate the entire system of levers and set all of the brakes, drawing the beams with heads and brakes up against the wheels, the hangers 29 swinging around the pins 30 to allow this.

The beams are supported by means of these hangers 29 with suitable hanger brackets 31 extending inward from the side frames. These are preferably carried on a cross bar 32 or 33 which extends across the truck from frame to frame beneath the bolster and beneath the brakes, although as shown in Figs. 7 and 8 they may be cast out as integral brackets from the frame, the numerals 31' and 38' in these figures designating the modified forms of the parts 31 and 38 in the other figures. In this case, however, they should not be connected across the frames by any rigid or integral tie. These hanger brackets extend from the one arch member inwardly toward the center of the truck and in cases when the cross bar is used the bar extends inwardly and on across the truck to the bracket on the opposite side. From the horizontal branch a vertical stem 38 rises away from the rail, and from the upper extremity of this stem one or more substantially horizontal arms 34 extend outward above the brake beams and terminate in the bosses 35 to receive the hanger pins 30. Thus there is provided a space adjacent the vertical stem of the bracket for the truck springs and the bracket is located in the space provided for it beneath the upwardly inclined bolster end.

Where two branches occur these extend in opposite directions longitudinally of the truck and the opposite brake hanger reactions in a measure counteract each other.

In cases where the cross bars 32 and 33 are used it is preferable that they be not rigidly secured to the frames as by riveting or casting. For there is a tendency for the opposite frames to move relative to each other and it is not desirable to construct this bar or cross member to resist this movement and set up undue side forces in the frames. Hence when the brackets 31 are connected together across the truck, I preferably provide open-side pockets 36 in the side frames, these being formed to receive the ends of the cross bars and restrain them against material movement either axially of the bars or longitudinally of the truck or vertically. In assembling, the side frames are simply slipped on the ends of the bars at the same time the frames are placed on the bolster arms and the keepers 37 of the bolster arms prevent the frames from spreading.

The cross bar 33 is also formed with openings or other means to support and guide the brake-actuating members 23, 24 and 28, the member 23 in the present embodiment being extended to engage an opening in this bar. The cross bar 32 also provides a desirable point for the location of the fulcrum 26 for the pivot end of the lever 18. When the cross bar is provided for my hanger brackets as shown the side frames are relieved of all torsional strains from the brake hanger loads or from the load of the fulcrum 26. The cross bar 32 is preferably formed of a commercial I-beam with the web horizontal and with the brake hanger bracket 31 riveted to the web and extending with the end of the I-beam into the pocket of the side frame near its lower edge.

The fulcrum bar 27 is secured to any convenient part of the truck structure such as one of the cross members 13, as shown in the drawings.

My brake mechanism thus described embodies improvements the merits of which will be appreciated by those familiar with the art. These improvements are of course susceptible of various embodiments, a preferred embodiment being shown in the drawings. The features are also applicable to trucks of many forms.

Having thus described my invention, what I claim is:

1. In a car truck brake, brake hangers, a side frame, a brake hanger bracket extending inwardly therefrom, said bracket originating near the lower edge of said side frame and being carried inwardly beneath the truck springs and upwardly toward the truck center and away from the rail, and there being means at the upper extremity of said bracket for the attachment thereto of a brake hanger.

2. In a car truck brake, brake hangers, a side frame, a brake hanger bracket extending inwardly therefrom, said bracket originating near the lower edge of said side frame and being carried horizontally inward and then vertically upward toward the truck center and away from the rail, and there being means at the upper extremity of said bracket for the attachment thereto of a brake hanger.

3. In a car truck brake, brake hangers, a side frame having the customary window opening therein with upper and lower arch members, a brake hanger bracket extending inwardly from the said lower arch member and being carried upwardly away from the rail, and means at the upper extremity of said bracket for the attachment thereto of a brake hanger.

4. In a car truck brake, brake hangers, a side frame, a brake hanger bracket extending inwardly therefrom, said bracket originating near the lower edge of said side frame and being carried inwardly and upwardly toward the truck center and away from the rail and carrying at its upper end a pair of branches which extend in opposite directions longitudinally of the truck, the same being provided at their extremities with means for the attachment thereto of the brake hangers.

5. In a car truck brake, brake hangers, a side frame having the customary window opening therein with upper and lower arch members, a brake hanger bracket extending inwardly from one of the said arch members and being then extended vertically toward the central, horizontal plane of the truck wheels, and a pair of branches extending from the end of the vertical stem of said bracket in opposite directions longitudinally of the truck, the same being provided at their extremities with means for the attachment thereto of the brake hangers.

6. In a car truck brake, side frames at each side of the truck, brake beams, a cross bolster extending across the truck and supported by the said side frames, the said bolster having its end portions disposed at a higher elevation than its central portion, brake hanger brackets carried by said side frames and extending inwardly therefrom, said brackets being disposed beneath the elevated ends of the said bolster and above the said brake beams, and brake hangers extending downwardly from said brackets to the said brake beams.

7. In a car truck brake, side frames at each side of the truck, brake beams, a cross bolster extending across the truck and supported by the said side frames, the said bolster having its end portions disposed at a higher elevation than its central portion, brake hanger brackets carried by the said side frames and extending inwardly therefrom, said brackets being disposed beneath the elevated ends of the said bolster and above the brake beams, and brake hanger brackets extending downwardly from the opposite end of the brake hanger brackets to the brake beams.

8. In a car-truck brake, side frames at each side of the truck, a cross bolster extending across the truck and supported by the side frames, a cross member extending across the truck from one frame to the other beneath the cross bolster and supported by the side frames, and having no vertical movement with respect to the side frames, and brake-hanger brackets extending vertically from the said cross member beneath the said cross bolster.

9. In a car truck brake, side frames at each side of the truck, a bolster extending from one frame to the other, a cross bar extending from one frame to the other beneath the said bolster and supported by the said side frames but not rigidly tied thereto, said cross bar carrying brake supporting means.

10. In a car truck brake, side frames at each side of the truck, pockets in the same, a cross bar extending from frame to frame with the ends thereof disposed within and supported by the said pockets, and brake hanger brackets attached to said cross bar.

11. In a car truck brake, side frames at each side of the truck, pockets in the same, a cross bar extending from side frame to side frame with the ends thereof disposed within and supported by the said pockets, the said pockets being formed to hold the said cross bar against axial movement, against vertical movement, and against horizontal movement.

12. In a car truck brake, side frames at each side of the truck, a cross bar extending from side frame to side frame, brake hanger brackets secured to said cross bar, brake-actuating members, and means carried by said cross bar for supporting and guiding the said brake-actuating members.

13. In a car truck brake, side frames at each side of the truck, a cross bar extending from side frame to side frame, brake-actuating members, and means carried by said cross bar for supporting and guiding the said brake-actuating members.

14. In a car truck brake, side frames at each side of the truck, pockets in said side frames, a cross bar extending from one to the other thereof and being supported in the said pockets, said cross bar carrying brake beam hangers and a brake lever fulcrum, the said pockets securing the said cross bar against axial movement, against vertical movement and against horizontal movement.

15. In a car truck brake, side frames at each side of the truck, a truck bolster, a cross bar extending from one to the other of the side frames, beneath the bolster, and supported by the side frames, said cross bar carrying a brake lever fulcrum and brake hanger brackets.

16. In a car truck brake, side frames at each side of the truck, a truck bolster, a cross bar extending from one to the other of the said frames, beneath the bolster, and supported by the side frames, said cross bar carrying a brake lever fulcrum.

17. In a car truck brake, side frames at each side of the truck, pockets in the same, an I-beam extending from side frame to side frame and being secured and supported in the said pockets, brake hanger brackets secured to the said I-beam, the said I-beam being turned with the web horizontal and the said brake hanger bracket being secured to the web thereof.

18. In a car truck brake, side frames at each side of the truck, brake beams, means for supporting the brake beams, said means embodying a beam extending transversely of the truck from side frame to side frame substantially beneath the brake beams, a hanger bracket extending upwardly from said beam to a point above the brake beams, and hangers depending therefrom adapted to support the brake beams.

19. In a car truck brake, side frames at each side of the truck, brake beams, means for supporting the brake beams, said means embodying a beam extending transversely of the truck from side frame to side frame beneath the brake beams, a hanger bracket extending upwardly from said beam to a point above the brake beams, and a hanger depending therefrom adapted to support a brake beam and in combination therewith a bolster extending transversely of the truck above the said beam and supported upon the side frames, the said bolster being bowed upwardly at its end to pass over the said hanger bracket.

20. In a car truck brake, three brake beams, a lever for each beam, the said beams being pivoted to the said levers between the extremities of the levers, an equalizing lever having a pivot point between its extremities, two lever-actuating members, one extending between an extremity of the said equalizing lever and the one extremity of the first of the said brake beam levers, the other extending between the other extremity of the said equalizing lever and the one extremity of the second of the said brake beam levers, the other extremity of the first brake beam lever being provided with a pivot point, a third lever-actuating member extending between the other extremity of the second brake beam lever and the one extremity of the third one thereof, the other extremity of the third brake beam lever being provided with a pivot point, and there being fulcrums applied to two of said pivot points and lever-actuating means applied to the other one of the same.

In testimony whereof I affix my signature in the presence of two witnesses.

BYERS W. KADEL.

Witnesses:
A. K. SIMMONS,
EARL H. FISHER.